UNITED STATES PATENT OFFICE.

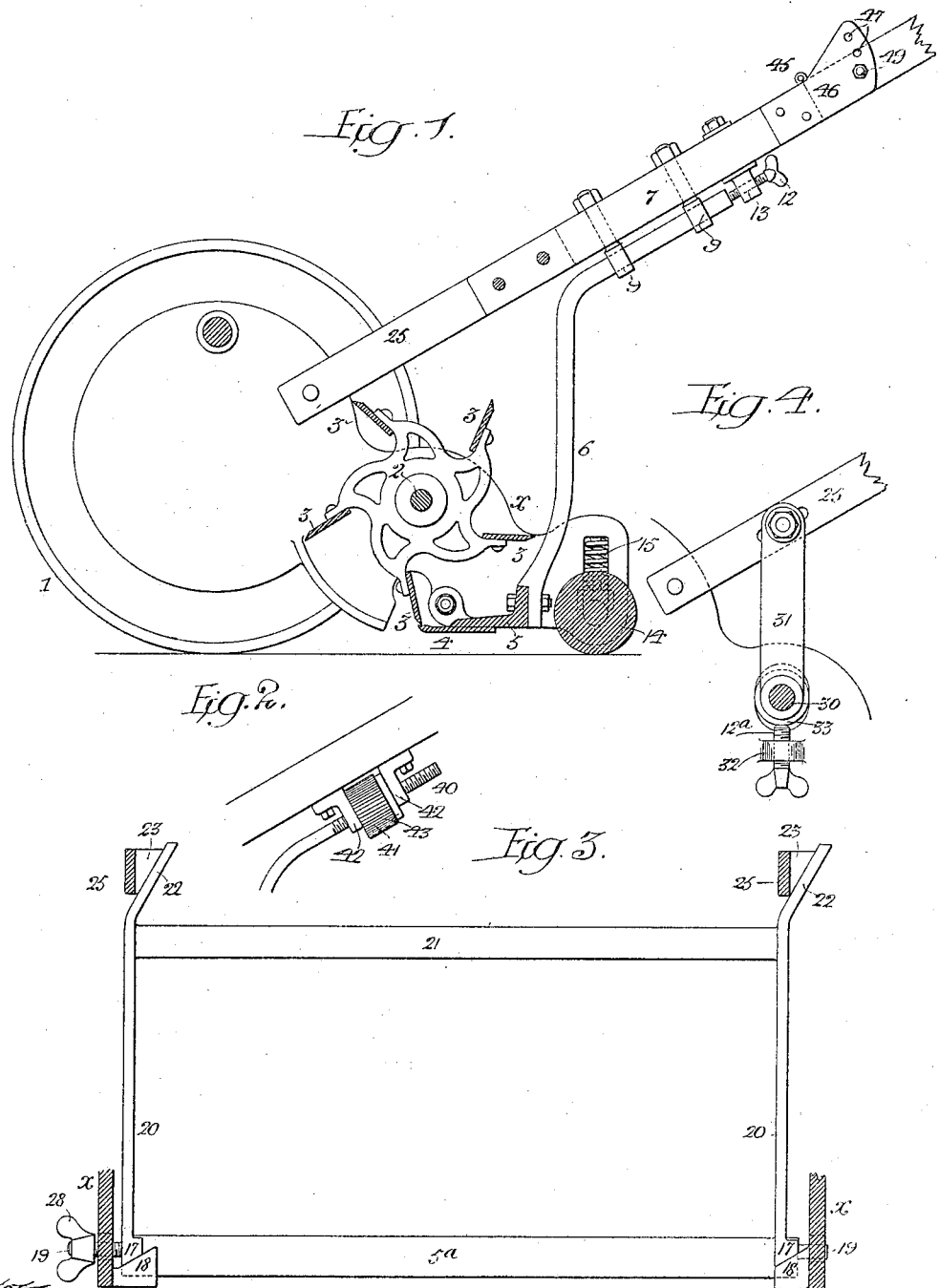

THOMAS S. SAYRE, OF CAPE MAY, NEW JERSEY.

LAWN-MOWER.

No. 818,301.　　　Specification of Letters Patent.　　　Patented April 17, 1906.

Application filed August 14, 1905. Serial No. 274,105.

*To all whom it may concern:*

Be it known that I, THOMAS S. SAYRE, a citizen of the United States, residing in Cape May city, New Jersey, have invented certain Improvements in Lawn-Mowers, of which the following is a specification.

The object of my invention is to so construct a lawn-mower that the contact between the cutting edges of the lower blade and the blades of the rotating reel can be readily regulated by movement of the handle of the mower. Such contact being under direct and immediate control of the person using the mower the edges of said lower blade and of the blades of the reel can always be kept in such frictional contact as to be self-sharpening, thus overcoming an objection to ordinary lawn-mowers, in which after a time the edges of the blades, and particularly the edge of the lower blade, become rounded and dull and require to be filed or ground to restore their sharpness, an operation requiring considerable skill not possessed by most persons who use lawn-mowers. Suitable provision is afforded for preventing such closeness of contact of the blades as will interfere with the free rotation of the reel.

In the accompanying drawings, Figure 1 is a vertical sectional view of sufficient of a lawn-mower to illustrate my present invention. Fig. 2 is a side elevation illustrating a special construction of the connection between the handle structure and the lower blade. Fig. 3 is a transverse section illustrating a certain modification of the invention; and Fig. 4 is a view, partly in side elevation and partly in section, illustrating another modification of the same.

Referring first to Fig. 1 of the drawings, 1 represents one of the traction-wheels of the lawn-mower; *x*, part of one of the fixed side frames; 2, the reel-shaft, driven from the traction-wheels in any of the usual ways; 3, the blades of the rotating reel, and 4 the lower blade, which is hung to a pivoted carrier 5, fulcrumed at 5$^b$, usually adjustable by means of set-screws, so as to vary the relation of the fixed blade to the blades of the reel. When the ordinary machine is in operation, this blade is fixed in its relation to the blades of the reel, and as soon as the blades wear so as to destroy the close frictional contact between them the blade 4 begins to acquire a rounded edge which impairs or destroys its cutting ability and necessitates resharpening by filing or grinding and a subsequent accurate readjustment so as to restore it to proper cutting relation with the blades of the reel.

The object of my invention is to provide by movement of the handle for varying the cutting relation of the lower blade and reel during the operation of the machine, so that the cutting edges of the reel-blades may at all times be caused to bear against the edge of the lower blade with any degree of force desired by the person operating the mower, thereby maintaining such frictional contacts as will maintain the edges of the blades constantly in sharp cutting condition. One method of accomplishing this result is shown in Fig. 1, on reference to which it will be observed that the blade-carrier 5 has secured to it the lower end of a rod 6, whose upper end is bent into a plane parallel with the under side of the handle 7 and is guided in a pair of eyebolts 9, secured to said handle. Movement imparted to the handle will therefore be transmitted to the blade-carrier 5, a rising movement of the handle elevating the rear end of the blade-carrier and depressing the cutting edge of the blade and a lowering movement of the handle depressing the rear portion of the blade-carrier and raising the cutting edge of the blade. The force with which the cutting edge of the blade bears against the cutting edges of the reel-blades will therefore be dependent upon the downward pressure imparted to the outer end of the handle. Besides having upward or downward movement imparted to it by reason of its connection with the handle the bent upper end of the rod 6 also has a certain amount of longitudinal play in the eyebolts 9, owing to the different arcs in which the rod and handle swing.

Longitudinal movement of the upper end of the rod 6 outwardly on the handle 7 is arrested by a stop-screw 12, which is adapted to a nut 13, secured to and projecting from the under side of the handle. Hence contact of said upper end of the rod with the stop-screw will serve to lock together the rod and handle, and owing to the different centers of rotation of the same will therefore prevent any further downward movement of said handle, while not interfering with free upward movement of the same. This stop thus provides for arresting the movement of the cutting edge of the blade 4 toward the cutting-blades of the reel and prevents said blade 4 from being forced so firmly into contact with the reel-blades as to interfere with the free rotation of the reel.

In order to prevent the rising movements of the roller 14 from being transmitted directly to the frame $x$ when the machine is being used on rough ground, and hence causing jolting of the frame and handles, which would affect the position of the blade 4 in respect to the reel-blades, I provide springs 15 between the upper bearing-boxes of the roller-spindle and the tops of the slots in the frame which receive said boxes, so that a certain amount of vertical movement of the roller 14 is permitted without corresponding movement of the frame.

Means other than those shown in Fig. 1 for accomplishing the object of my invention, but within the scope of said invention, will readily suggest themselves to those skilled in the art, and several of such different means I have illustrated in the drawings.

When it is desired to lock the handle to the rod 6 against independent movement in either direction, the said rod member may have a threaded end 40, adapted to a nut 41, confined between lugs 42 on the handle, as shown in Fig. 2, an elastic washer 43 being, if desired, interposed between the nut and one of the lugs to provide a yielding bearing for the rod on the handle.

The blade-carrier $5^a$ (shown in Fig. 3) has at each end a tapered lug 17, which rests upon a correspondingly-tapered lug 18, projecting inwardly from one of the fixed side frames $x$ of the mower, the blade being deprived of fore-and-aft movement by means of pins 19 at its opposite ends, which pins pass through vertically-elongated slots in the side frames, as shown by dotted lines in Fig. 3.

Projecting upwardly from each end of the blade-carrier $5^a$ is an arm 20, these arms being connected at their upper ends by means of a transverse brace or stay 21 and each arm being diagonally bent at its upper end, as shown at 22, both bends being in the same direction.

The diagonally-bent portions of the arms are acted upon by wedge-blocks 23, mounted upon the handle-braces 25, and when the handle-bar is raised the arms are released from pressure and the carrier-bar $5^a$ is permitted to assume its normal position of rest with the blade 4 away from the teeth of the rotating reel, downward movement of the handle, however, causing lateral movement of the arms 20, and thus causing the wedges 17 to rise on the wedges 18, so as to lift the blade 4 and press its cutting edge against the cutting edges of the reel-blades. This upward movement is limited by a thumb-nut 28 on one of the end pins 19 of the blade-carrier $5^a$, the inner face of this nut, by contact with the side frame $x$ of the mower, limiting that side movement of the blade-carrier which results in a rise of the same.

Instead of adjusting the lower blade in respect to the blades of the reel I may, if desired, reverse the operation and adjust the blades of the reel in respect to said lower blade. A simple means for accomplishing this result is to suspend each of the reel-shaft bearings 30 from the handle-brace 25 on that side of the mower by means of a link 31, as shown in Fig. 4, so that upward or downward movement of the handle will cause upward or downward movement of the reel, the downward movement of each bearing 30 being restricted by means of a stop-screw $12^a$, which is adapted to a threaded opening in a lug 32, projecting inwardly from the corresponding side frame of the mower, each of said side frames having an elongated opening 33 therein for the reception of the corresponding reel-shaft bearing, so as to permit of the desired vertical movement of the latter.

In order to permit adjustment of the upper portion of the handle to different heights without affecting the connection between the handle and the cutting mechanism, said handle is made in two parts hinged together, as at 45, the lower part carrying the blade connections and having side plates 46, each with a series of openings 47 for the reception of a transverse pin or bolt 49, which passes through an opening in the upper member of the handle, so that the latter can be adjusted to different angles in respect to the lower member and can after either such adjustment be rigidly secured in position.

Having thus described my invention, I claim and desire to secure by Letters Patent—

1. The combination of the frame, lower blade, rotating reel, and handle structure of a lawn-mower, with means controlled by the handle for varying the relative positions of the lower blade and reel-blades by movement of said handle.

2. The combination of the frame, lower blade, rotating reel, and handle structure of a lawn-mower, with a connection controlled by the handle between the said lower blade and the handle structure whereby the cutting edge of said blade can be adjusted in respect to the cutting edges of the reel-blades by movement of the handle.

3. The combination of the frame, lower blade, rotating reel, and handle structure of a lawn-mower, with a pivoted carrier for said lower blade, and a connection controlled by the handle between said carrier and the handle structure, whereby adjustment of the cutting edge of the lower blade in respect to the cutting edges of the reel-blades can be effected by movement of the handle.

4. The combination of the frame, lower blade, rotating reel and handle structure of a lawn-mower, with an adjusting device for said lower blade, located on and controlled by said handle structure, for varying the relative position of the lower blade and reel.

5. The combination of the frame, lower blade, rotating reel and handle structure of a lawn-mower, with a connection between the lower blade and the handle and controlled by said handle whereby the relative positions of said lower blade and reel-blades can be varied by movement of the handle, and means for arresting that movement which causes approach of said cutting edges.

6. The combination of the frame, lower blade, and rotating reel of a lawn-mower, with a two-part handle structure having its upper member capable of being raised and lowered independently of the lower member, and a connection controlled by the handle whereby the relative positions of the lower blade and the reel-blades can be varied by movement of said lower member of the handle.

7. The combination of the frame, lower blade, rotating reel and handle structure of a lawn-mower, a carrier for the lower blade and a rod connecting said carrier to the handle structure, and guided on the latter so as to be susceptible of movement independently thereof.

8. The combination of the frame, lower blade, a supporting-axle and a rotating reel thereon, and handle structure of a lawn-mower and a carrier for said lower blade, pivotally connected to the frame at different points from the reel-supporting axle, a rod connecting said carrier to the handle structure and serving, by movement of the handle structure, to adjust the lower blade with respect to the reel, and means for arresting movement of said rod on the handle structure.

9. The combination of the frame, lower blade, rotating reel, and handle structure of a lawn-mower, a connection controlled by the handle whereby the cutting relation of the lower blade and the reel-blades can be varied by movement of the handle, and a roller yieldingly mounted on the frame of the mower.

In testimony whereof I have signed my name to this specification in the presence of two subscribing witnesses.

THOS. S. SAYRE.

Witnesses:
C. J. ERICH,
A. J. SEELEY.